United States Patent [19]
Mukaino

[11] Patent Number: 5,261,087
[45] Date of Patent: Nov. 9, 1993

[54] ELECTRONIC INFORMATION RETRIEVAL SYSTEM WITH RELATIVE DIFFERENCE ANALYZER

[75] Inventor: Hirofumi Mukaino, Shizuoka, Japan

[73] Assignee: Yamaha Corporation, Shizuoka, Japan

[21] Appl. No.: 490,000

[22] Filed: Mar. 7, 1990

[30] Foreign Application Priority Data

Mar. 7, 1989 [JP] Japan .................................. 1-53982

[51] Int. Cl.$^5$ .............................................. G06F 15/40
[52] U.S. Cl. .................................. 345/600; 364/922.7; 364/943.41; 364/DIG. 2; 364/419.19
[58] Field of Search ................... 364/900, 419; 84/645; 345/600

[56] References Cited

U.S. PATENT DOCUMENTS

| | | | |
|---|---|---|---|
| 3,651,483 | 3/1972 | Clark, IV et al. | 395/800 |
| 4,318,184 | 3/1982 | Millett et al. | 393/600 |
| 4,328,561 | 5/1982 | Convis et al. | 364/419 |
| 4,383,307 | 5/1983 | Gibson | 395/575 |
| 4,471,459 | 9/1984 | Dilkinson et al. | 364/419 |
| 4,603,386 | 7/1986 | Kjaer | 364/419 |
| 4,745,836 | 5/1988 | Dannenberg | 84/1.03 |
| 4,783,758 | 11/1988 | Kucera | 364/419 |
| 4,833,610 | 5/1989 | Zamura et al. | 364/419 |

OTHER PUBLICATIONS

User's Manual for Wordstar Professional Release 4.0 (1979, 1987, Micropro International Corp.) pp. 242-245.
Guidebook for Wordstar 5.0 (1988, Micro Pro International Corp.) p. 103 Partial Translation From Japanese Guidebook for Mac Write (1985, Apple Computer, Inc.,) pp. 84-86.

Primary Examiner—Thomas C. Lee
Assistant Examiner—Paul Lintz
Attorney, Agent, or Firm—Sughrue, Mion, Zinn, Macpeak & Seas

[57] ABSTRACT

A musical information retrieval system, for providing pieces of musical information to a user, is equipped with a relative difference analyzer for improvement of an average access time period even if the user is not familiar with an electronic processing system, and the relative difference analyzer comprises an input unit for providing a key word representative of a piece of identifying information indicative of an attribute of a musical composition, a data file including a plurality of books respectively having index records for storing respective pieces of musical attributive catalog information and detail data records for storing respective pieces of detailed musical data information associated with the pieces of detailed musical data information, respectively, an analyzer for searching the index records for candidates each partially identical with the piece of identifying information but partially different from the piece of identifying information, and a displaying unit for indicating the relative differences, if any.

27 Claims, 8 Drawing Sheets

|   |   |   |   |   | P | O | N | M | L | K | J | I | H | G | F | E | D | C | B | A |
|---|---|---|---|---|---|---|---|---|---|---|---|---|---|---|---|---|---|---|---|---|
|   | Z |   |   |   | 0 | 1 | 0 | 1 | 0 | 0 | 0 | 1 | 1 | 0 | 0 | 0 | 0 | 1 | 0 | 1 |
|   | 0 |   |   |   |   | 5 |   |   |   | 1 |   |   |   | 8 |   |   |   | 5 |   |   |
| 0 | 0 | 0 | 0 |   |   |   |   |   |   |   |   |   |   |   |   |   |   |   |   |   |

FIG.5

|   |   |   |   |   |   |   | B | A# | A | G# | G | F# | F | E | D# | D | C# | C |
|---|---|---|---|---|---|---|---|----|---|----|---|----|---|---|----|---|----|---|
|   |   |   |   |   | - | - | 0 | 0  | 0 | 0  | 0 | 0  | 0 | 1 | 0  | 1 | 0  | 1 |
|   |   |   |   |   |   |   |   | 0  |   |    |   | 1  |   |   |    | 5 |    |   |
| 0 | 0 | 0 | 0 | 0 | 0 |   |   |    |   |    |   |    |   |   |    |   |    |   |

FIG.6

ELECTRONIC INFORMATION RETRIEVAL SYSTEM WITH RELATIVE DIFFERENCE ANALYZER

FIELD OF THE INVENTION

This invention relates to an electronic information retrieval system and, more particularly, to an information retrieval system used in the musical field for searching details of musical compositions through an identifying key such as, for example, a composer.

DESCRIPTION OF THE RELATED ART

In general, a musical data file consists of a large number of books respectively assigned to, for example, musical compositions, and each of the musical compositions is accompanied with indexing key words indicative of some attributes such as a composer's name and a phrase featuring the musical composition. When an information retrieval system is fabricated for providing an access way to the musical data file, a user supplies an identifying key word representative of an attribute of one of the musical compositions, and the information retrieval system searches the data file for the musical composition accessed. The information retrieval system then provides pieces of musical information indicative of the musical composition through an appropriate interface, and, for this reason, the user is able to quickly obtain the necessary musical information.

However, no relative difference analyzer is provided in the prior art information retrieval system, and, therefore, a problem is encountered in that an average access time is relatively long whenever the user has merely a vague identifying key. For example, assuming now that the user needs to access pieces of stored musical information related to a Japanese composer "Oomachi", however, if the name is vague for the user and, accordingly, the user supplies an incorrect identifying key word indicative of "Ohmachi" or "Oomati", the user hardly accesses the necessary pieces of information, and, for this reason, needs to repeatedly try the access until the identifying key word is hit or match with the indexing key.

If a wildcard is available in the information retrieval system, the user can access the necessary pieces of information with an indexing key word such as "O*achi" or "O?machi" (where "*"or "?" is the wildcard indicative of the undefined character); however, the user thus accessing needs to be familiar with the wildcard, and should know the undefined character "o" in the correct character string "Oomachi". However, most of the users are not familiar with the wildcard, nor are they able to specify the undefined character. In this situation, the information retrieval system responsive to such an identifying key word with a wildcard never provides a solution, and most of the users respectively repeat the procedure or abandon the same through the information retrieval system.

SUMMARY OF THE INVENTION

It is therefore an important object of the present invention to provide an information retrieval system through which a user accesses necessary pieces of information even though an identifying key is not know precisely.

It is also an important object of the present invention to provide an information retrieval system which is easy for a user in the musical field.

To accomplish these objects, the present invention proposes to provide a relative difference analyzer in an information retrieval system.

In accordance with the present invention, there is provided an information retrieval system including a relative difference analyzer which comprises a) input means for providing a key word representative of a piece of identifying information, b) a data base including a data file having a plurality of books respectively having index records for storing respective pieces of attributive catalog information and detail data records for storing respective pieces of detailed data information, the pieces of attributive catalog information being associated with the pieces of detailed data information, respectively, c) analyzing means for searching the index records for relative differences of the piece of identifying information represented by the key word, each of the relative differences being partially identical with the piece of identifying information but partially different from the piece of identifying information, and d) indicating means for indicating the relative differences, if any.

In accordance with another aspect of the present invention, there is provided an information retrieval system for providing pieces of musical information including a relative difference analyzer, the relative difference analyzer comprising: a) input means for providing a key word representative of a piece of identifying information, the piece of identifying information being indicative of a musical attribute; b) a data base including a data file having a plurality of books respectively having index records for storing respective pieces of musical attributive catalog information and detail data records for storing respective pieces of detailed musical data information, the pieces of musical attributive catalog information being associated with the pieces of detailed musical data information, respectively, c) analyzing means for searching the index records for relative differences of the piece of identifying information represented by the key word, each of the relative differences being partially identical with the piece of identifying information but partially different from the piece of identifying information, and d) indicating means for indicating the relative differences, if any If a user causes the input means 1 to supply a key word representative of a piece of identifying information, the input means 1 transfer the key word to the analyzing means 2 as shown in FIG. 1. With the key word, the analyzing means 2 access to the data file 3, and the pieces of the indexing information are sequentially read out to the analyzing means. The analyzing means 2 analyzes the pieces of indexing information to determine the relative differences between the indexing information and the key word. After the pieces of indexing information are thus examined, the relative differences, if any, are supplied to the indicating means for indication. Then, the user notices that the key word is incorrect, and can select the correct key word from the relative differences. This assistance is conducive to enhancing the access speed or decreasing the access time even though the user is not familiar with the electronic information processing technology.

The information retrieval system thus arranged may be used for searching for pieces of musical data information such as, for example, musical compositions, and each of the musical compositions may be provided with labels or indexes each indicative of an attribute of the musical composition such as the composer's name or a typical phrase featuring the composition.

BRIEF DESCRIPTION OF THE DRAWINGS

The features and advantages of an electronic information retrieval system according to the present invention will be more clearly understood from the following description taken in conjunction with the accompanying drawings in which:

FIG. 5 is a view showing the relationship between bit positions and the letters in the alphabet used for producing a reference bit string;

FIG. 6 is a view showing the relationship between bit positions and the notes of a musical scale used for producing a reference bit string;

DESCRIPTION OF THE PREFERRED EMBODIMENT

Arrangement of Hardware

Figure 1:
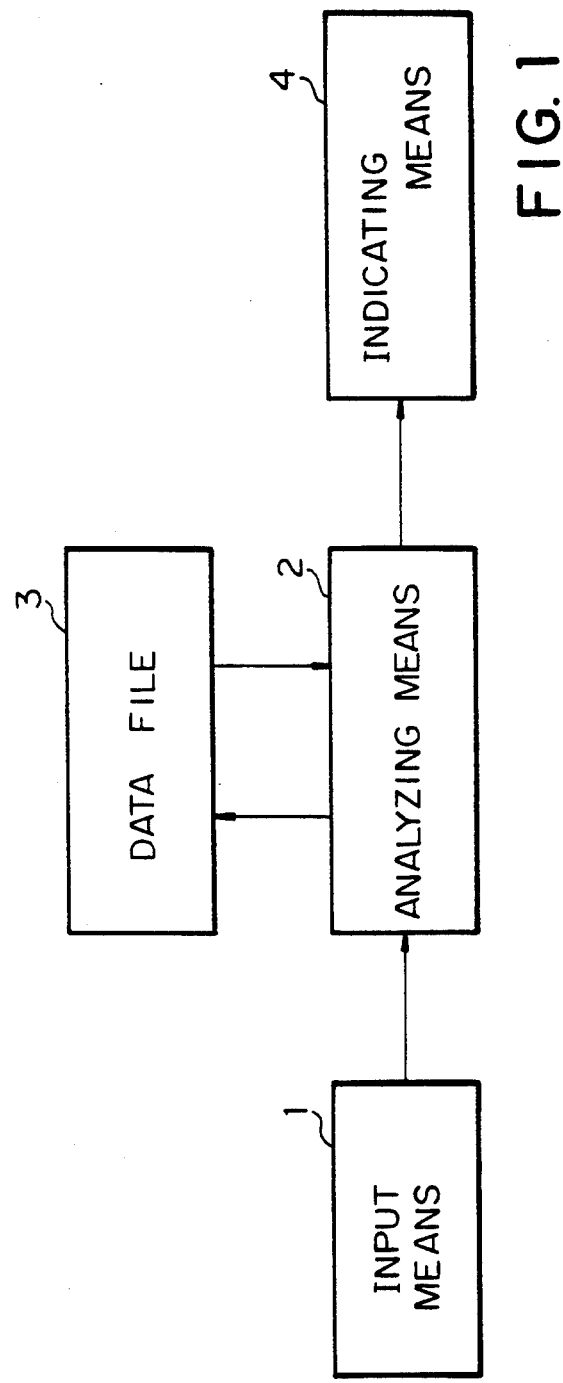
FIG. 1 is a block diagram showing the interrelation between the elements of the present invention.
Figure 2:
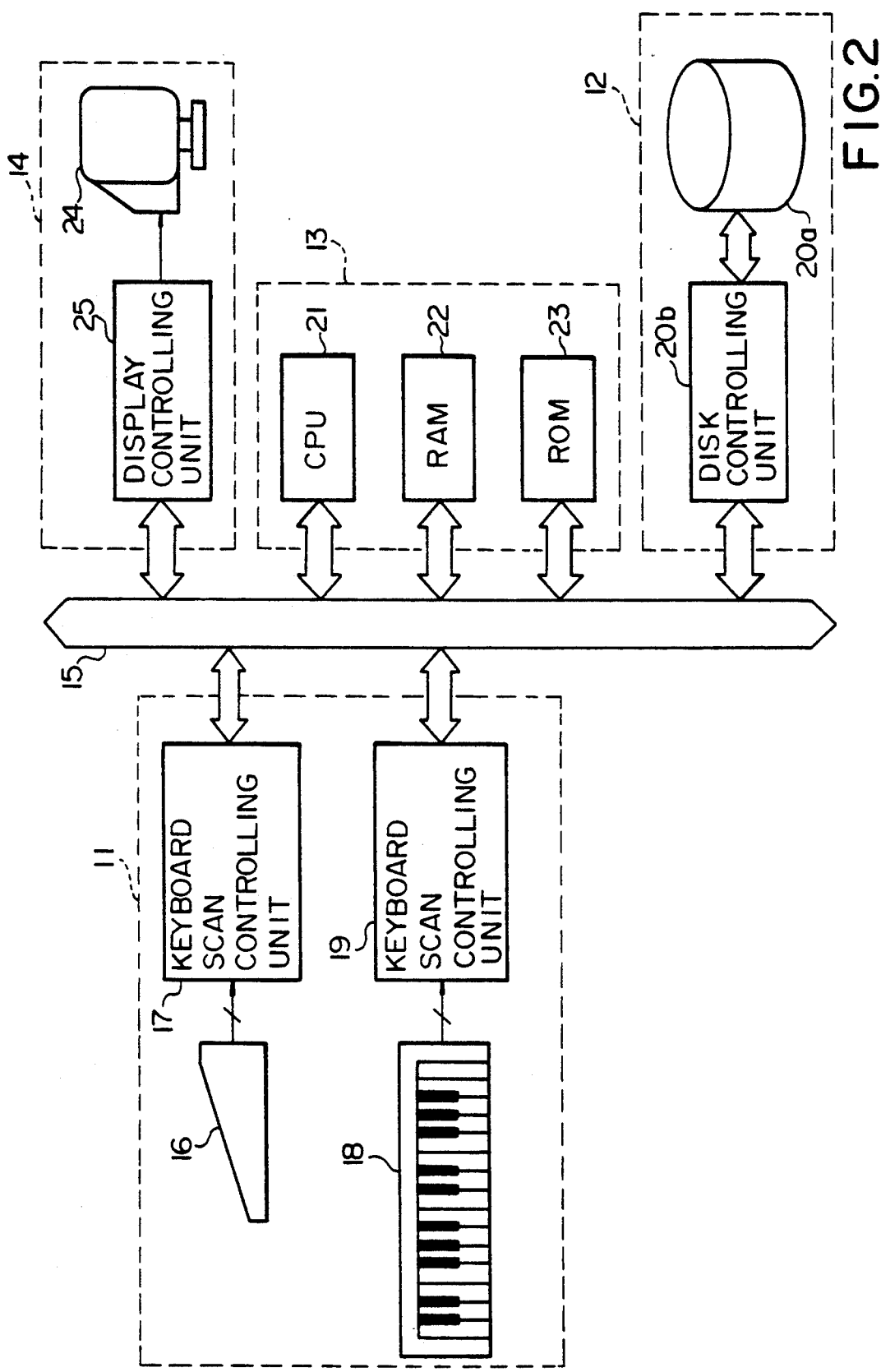
FIG. 2 is a block diagram showing the arrangement of an information retrieval system embodying the present invention.

Referring first to FIG. 2 of the drawings, an information retrieval system embodying the present invention largely comprises a key word input section 11, a data storage section 12, a data processing section 13 and a display section 14 which are analogous to the input means 1, the data file 3, data analyzing means 2 (together with a program sequence described hereinbelow) and the indicating means 4, respectively, and the four sections 11 to 14 are communicable with one another through a multi-bit bus system 15.

The key word input section 11 has a character keyboard unit 16 associated with a keyboard scan controlling unit 17 for detection of a keying-in on the character keyboard unit 16. The character keyboard unit 16 has a plurality of keys assigned to the alphabet and/or another set of characters, and the keys are periodically scanned by the keyboard scan controlling unit 17. While the controlling unit 17 scans the character keyboard unit 16, the keys depressed by a user are detected and identified by the controlling unit 17 through an execution of a certain software. However, such a scanning technology is well known in the art, so that no further description is incorporated hereinbelow. After the identification of the keys successively depressed, the keyboard scan controlling unit 17 codes the character string into a key word representative of a piece of identifying information, the piece of identifying information being, by way of example, indicative of a composer's name. Since the keyboard scan controlling unit 17 is coupled to the multi-bit bus system 15, the key word is relayed to the data processing section 13 therethrough.

A musical keyboard unit 18 is further incorporated in the data input section 11, and is also associated with a keyboard scan controlling unit 19. When a series of keys of the musical keyboard unit 18 are sequentially depressed by the user, the keyboard scan controlling unit 19 identifies the keys depressed, and produces another key word on the basis of the keys thus identified. The key word supplied from the musical keyboard unit 18 is representative of another piece of identifying information which in turn is indicative of a typical phrase featuring a musical composition. However, the key word may be indicative of the first phrase of a musical composition in another implementation. The keyboard scan controlling unit 19 is also coupled to the multi-bit bus system 15, and, accordingly, is transferred to the data processing section 13 similar to the key word supplied from the character keyboard unit 16.

The data storage section 12 is implemented by a hard disk or a magnetic disk 20a associated with a disk controlling unit 20b, and a musical data base is established in the hard disk 20a. The structure of musical data base is described hereinbelow in detail.

The data processing section 13 comprises a central processing unit 21 (which is abbreviated as "CPU" in the drawings), a data memory unit 22 implemented by random access semiconductor memory devices (which are abbreviated as "RAM") and a program memory unit 23 implemented by read only semiconductor memory devices (which are abbreviated as "ROM"), and these component units are communicable with one another through the multi-bit bus system 15. The program memory unit 23 stores a program sequence necessary for implementation of various functions such as arithmetic and logical functions, a data transfer function and so on which are used for implementing a relative difference analyzer. The central processing unit 21 executes the program sequence to achieve the relative differences as well as other jobs assigned thereto, and the data registers incorporated therein are assumed to be n bit in size in this instance. The data memory 22 provides a temporary data storage used on the way to achievement of the various jobs.

The display section 14 comprises a display unit 24 associated with a display controlling unit 25, and the display controlling unit is supplied from the central processing unit 21 with image signals indicative of character strings, and the character strings are indicative of messages and relative differences of a piece of identifying information supplied from either character or musical keyboard 16 or 18.

Structure of Data Base

Figure 3:
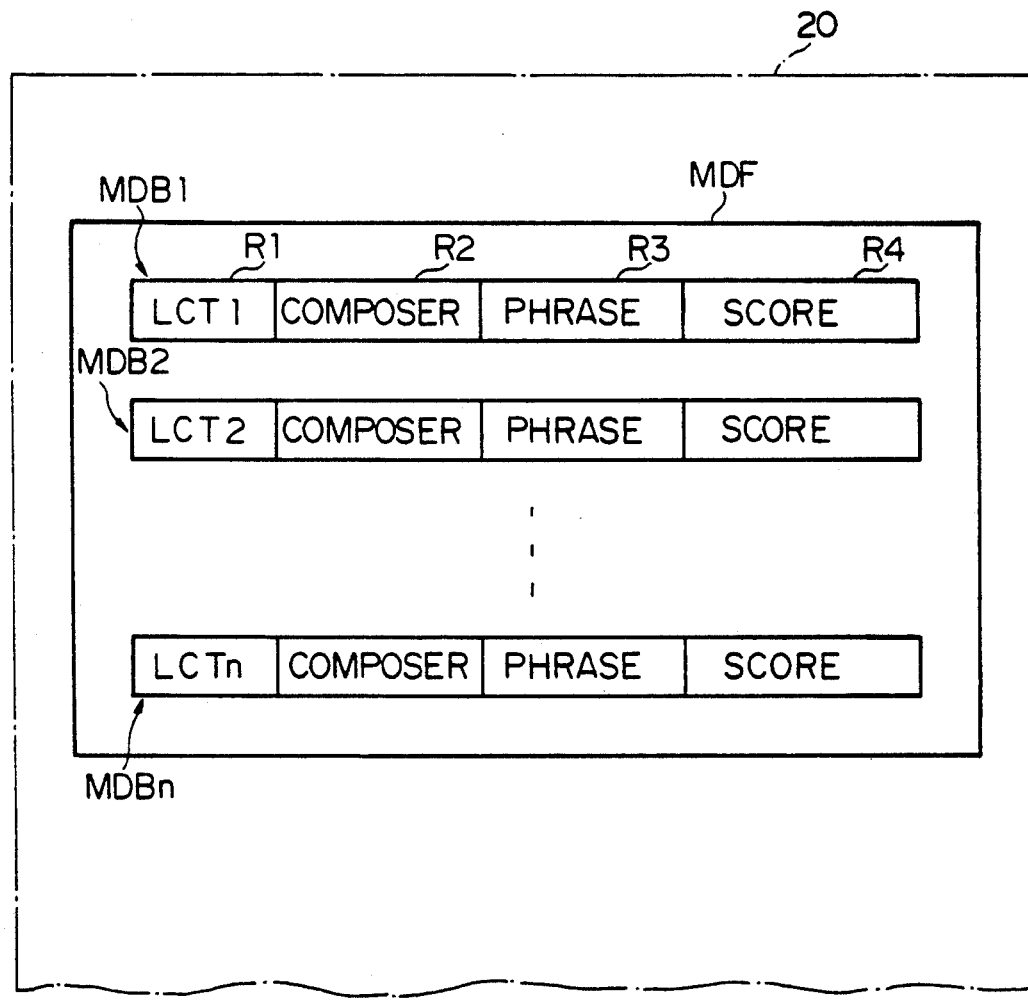
FIG. 3 is a view showing the layout of a musical data file to which a user can access through the information retrieval system shown in FIG. 2.

The musical data base established in the hard disk unit 20a has a musical data file MDF and two index tables TBL1 and TBL2, and the layout of the musical data file MDF is shown in FIG. 3. Referring to FIG. 3, the musical data file MDF consists of a plurality of musical data books MDB1, MDB2, . . . . and MDBn, and all of the musical data books MDB1 to MDBn are identical in the structure with one another, so that description is made on the musical data book MDB1 only for the sake of simplicity.

The musical data book MDB1 has four records R1, R2, R3 and R4, i.e., a locative record R1, attribute records R2 and R3 and score record R4, and the attribute records R2 and R3 are assigned to pieces of musical attributive catalog information. In this instance, the attribute record R2 memorizes one of the pieces of musical attributive catalog information indicative of a composer's name, and the attribute record R3 is used for storing another piece of musical attributive catalog information indicative of a typical phrase of a musical composition. The full score of the musical composition is memorized in the score record R4, and a piece of locative information LCT1 is provided in the locative record R1. The typical phrase is selected from the musical composition in such a manner as to be the first phrase or a typical phrase featuring the musical composition.

The locative record R1 has a plurality of fields used for memorizing a piece of locative information, and one of the fields is assigned to a book name, but another keeps an address location where the piece of musical data information is memorized.

The attribute record R2 is also provided with a plurality of fields, and a coded composer's name and a reference bit string thereof are maintained in two of the fields. The composer's name is coded into the corresponding reference bit string for the sake of alignment with the data registers incorporated in the central processing unit 21, and, for this reason, each of the reference bit strings is equal in size to the data registers incorporated in the central processing unit 21. As described hereinbefore, each of the data registers is assumed to be n bit in size, and, for this reason, the reference bit string is also n bit in size. Thus, each of the composer's names is coded into the reference bit string equal in size to the data registers, so that the central processing unit 21 easily searches the index table TBL1 or TBL2 at a high speed as described hereinbelow with reference to FIG. 7. One of the musical data books contains "Oomachi Ox-00005185 /usr /songs /eseq / 00000001.esp", Oomachi being a Japanese composer's name which is coded into the corresponding reference bit string "Ox-00005185" where Ox indicates that the bit string is in hexadecimal coding. A piece of information indicated by "usr" to "00000001.esp" is representative of a memory space where the coded name is memorized. The rule of coding are hereinafter described in detail.

Figure 4:
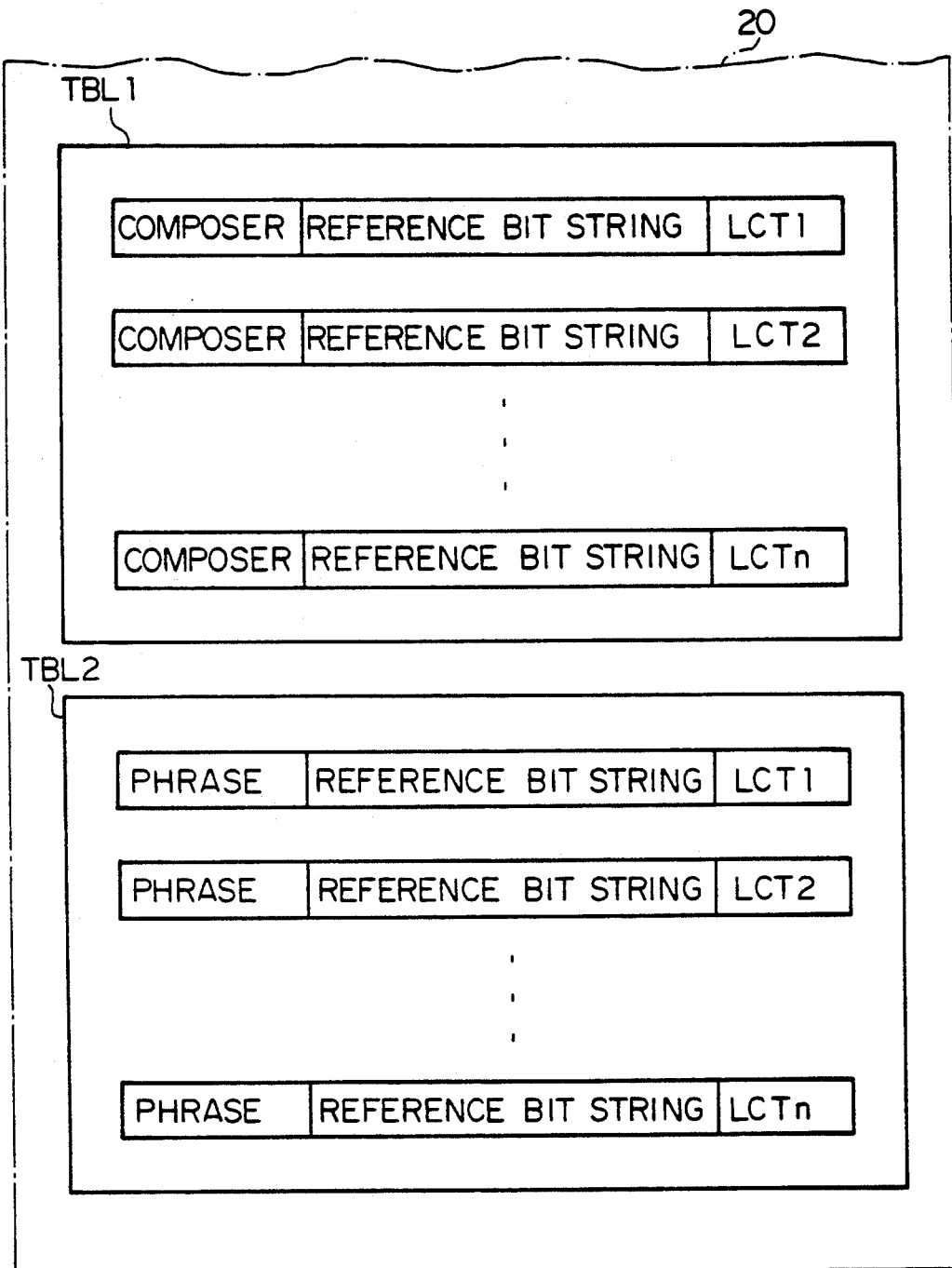
FIG. 4 is a view showing the layout of index tables used in the searching operation carried out by the information retrieval system shown in FIG. 3.

The index tables TBL1 and TBL2 are provided in association with the musical data file MDF for making the searching operation easy, and are also memorized in the hard disk unit 20a. The layout of the first index table TBL1 is illustrated in FIG. 4, and the first index table TBL1 has a plurality of columns respectively assigned to the composer's names, the reference bit strings thereof and pieces of locative information LCT1, LCT2, . . . and LCTn used for linking the index table TBL with the music data file MDF. Each of the composer's names is linked with the corresponding reference bit string as well as with the piece of locative information, so that the central processing unit 21 can access the piece of musical data information by searching the index table TBL1 for the reference bit string corresponding to the composer's name as represented by the key word. Since the reference bit string is equal in size to the data registers, the searching operation consumes a relatively short time period.

The second index table TBL2 is similar in the layout to the first index table TBL1, and also has a plurality of columns respectively assigned to the phrases of the musical compositions, the reference bit strings thereof and the pieces of locative information LCT1 to LCTn. The piece of locative information is used for linking the index table TBL2 with the musical data file MDF. Each of the phrases corresponds to the reference bit string thereof and the piece of locative information. The central processing unit 21 also searches the second index table TBL2 within a relatively short time period, because the phrases are associated with the respective reference bit strings equal in the size to the data registers of the central processing unit 21.

Description is now made on the rule through which the composer's name and the phrase are coded into the respective reference bit strings. Assuming now that bit positions of 32-bit word are assigned to all of the letters in the alphabet, letter a is assigned the first bit position or the least significant bit, letter b is assigned the second bit position, and letter a is assigned the twenty-sixth bit position, so that the letters are related to the bit positions as indicated by Table 1.

TABLE 1

| Bit Position | Letter |
|---|---|
| First (The least significant bit) | a |
| Second | b |
| Third | c |
| . | . |
| . | . |
| . | . |
| Eighth | h |
| Ninth | i |
| . | . |
| . | . |
| . | . |
| Thirteenth | m |
| . | . |
| . | . |
| . | . |
| Fifteenth | o |
| . | . |
| . | . |
| . | . |
| Twenty sixth | z |

According to the rule, component letters of a composer's name make the corresponding bit positions be "1", but any corresponding bit position of nonuse letter is allowed to be "0". Let us construct the reference bit string of the Japanese composer "Oomachi" in accordance with the rule. The component letters are "o" (twice), "m", "a", "c", "h" and "i", so that the first third, eighth, Ninth, thirteenth and fifteenth bit positions should be "1", but the other bit positions remain in "0" as shown in FIG. 5. The four bits from the right side are "0101" which is "5" in hexadecimal notation, and the fifth to eighth bits are "1000" which is "8" in hexadecimal notation, the ninth to twelve bits "0001" being represented as "1" in hexadecimal notation, the thirteenth to sixteenth bits "0101" as "5", but the other four bit groups are tantamount to "0" in hexadecimal notation. As a result, the Japanese composer "Oomachi" is coded into the reference bit string "00005185".

This rule is also applicable to another set of characters such as the Japanese cursive kana characters. The Japanese cursive kana character set consists of more than 32 characters, so that a part of the bit positions are assigned twice as shown in Table 2.

TABLE 2

| Bit Position | Character | | |
|---|---|---|---|
| First (The least significant bit) | a | and | mu |
| Second | i | and | me |
| Third | u | and | mo |
| . | . | | . |
| . | . | | . |
| . | . | | . |
| Thirty second | mi | | |

In Table 2, the Japanese cursive kana characters are represented by using a method of writing Japanese in Roman characters. If the rule is applied to another Japanese composer "Rentaro", we obtain the corresponding reference bit string "00009804" in the hexadecimal notation.

The rule is further applied to a phrase consisting of a plurality of notes. In this application, the bit positions are assigned the notes of a musical scale, and Table 3 shows the correspondence between the bit positions and the notes.

TABLE 3

| Bit Position | Note |
|---|---|
| First | C |
| Second | C# or Db |
| . | . |
| . | . |
| . | . |
| Twelfth | B |

Using Table 3, a phrase "C,D,E,C,E,C,D" is coded int a reference bit string "00000015" in hexadecimal notation, with only the first, third and fifth bit positions being "1" as shown in FIG. 6.

Software

Figure 7:
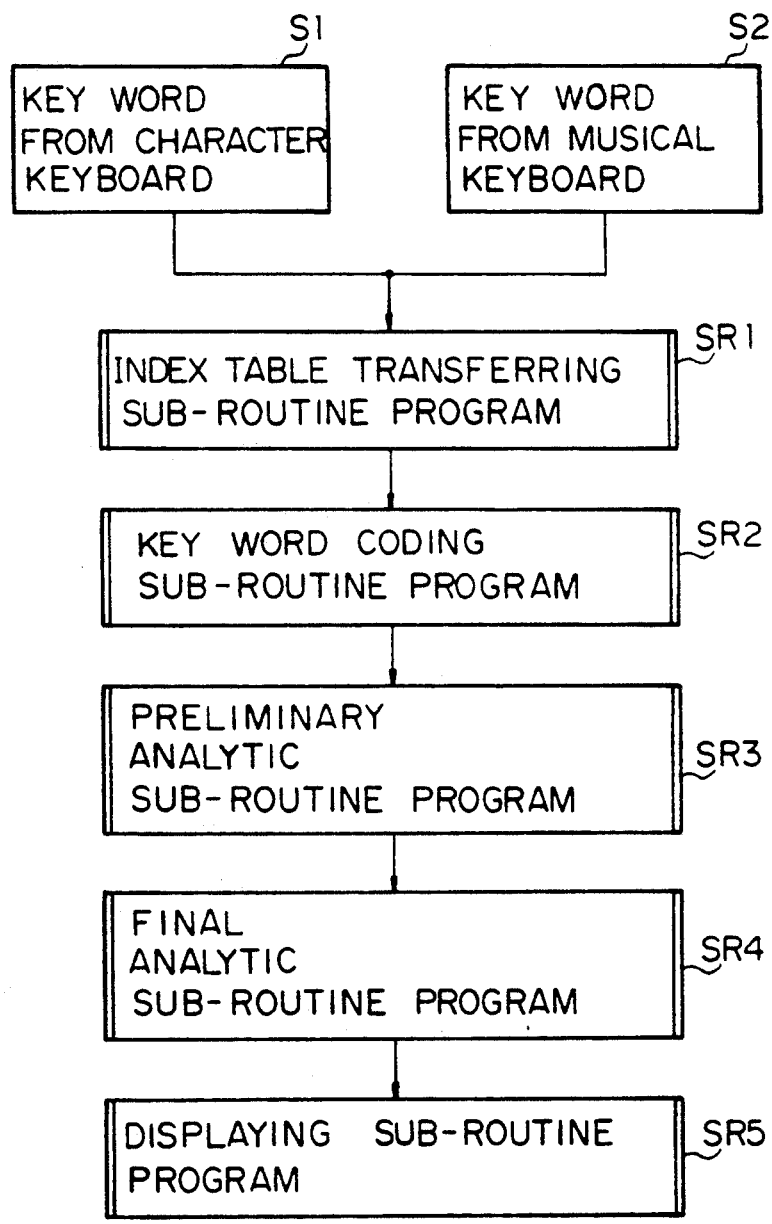
FIG. 7 is a flowchart showing a program sequence executed by a data processing section of the information retrieval system shown in FIG. 3.

In this instance, the related difference analyzer is implemented by a program sequence executed by the data processing section 13. Referring to FIG. 7 of the drawings, the program sequence starts with the acceptance of the key word supplied from either character or musical keyboard unit 16 or 18 as by step S1 or S2. As described hereinbefore, the key word indicative of a composer's name is provided through keying-in operation on the character keyboard 16, and is coded by the keyboard scan controlling unit 17. On the other hand, the key word indicative of a phrase is supplied through keying-in operation on the musical keyboard 18, and is also ooded by the keyboard scan controlling unit 19.

When the acceptance is completed, the central processing unit 21 proceeds to an index table transferring subroutine program SR1. In the index table transferring subroutine program SR1, the central processing unit 21 checks the key word to see whether the accepted key word represents a composer's name or a phrase. If the key word represents a composer's name, the central processing unit 21 requests the disk controlling unit 20b to transfer the index table TBL1 to the data memory unit 22. However, if the accepted key word represents a phrase, the index table TBL2 is transferred from the hard disk 20a to the data memory unit 22. Thus, when the index table transferring sub-routine program is completed, the central processing unit 21 proceeds to a key word coding sub-routine program SR2.

In the key word coding sub-routine program SR2, the central processing unit 21 produces a reference bit string of the accepted key word under the rule described hereinbefore. The reference bit string thus produced is transferred to the data memory unit 20a and memorized therein. Since the index table TBL1 or TBL2 has been already been memorized in the data memory 22, the data memory unit 22 maintains the pieces of musical attributive catalog information in the form of both the reference bit strings and the coded character or note strings, and further keeps the piece of identifying information also in the form of both of the reference bit string and the character or note string. When both of the reference bit strings are memorized in the data memory 22, the central processing unit 21 begins to execute an instruction sequence of a preliminary analytic sub-routine program SR3.

Figure 8:
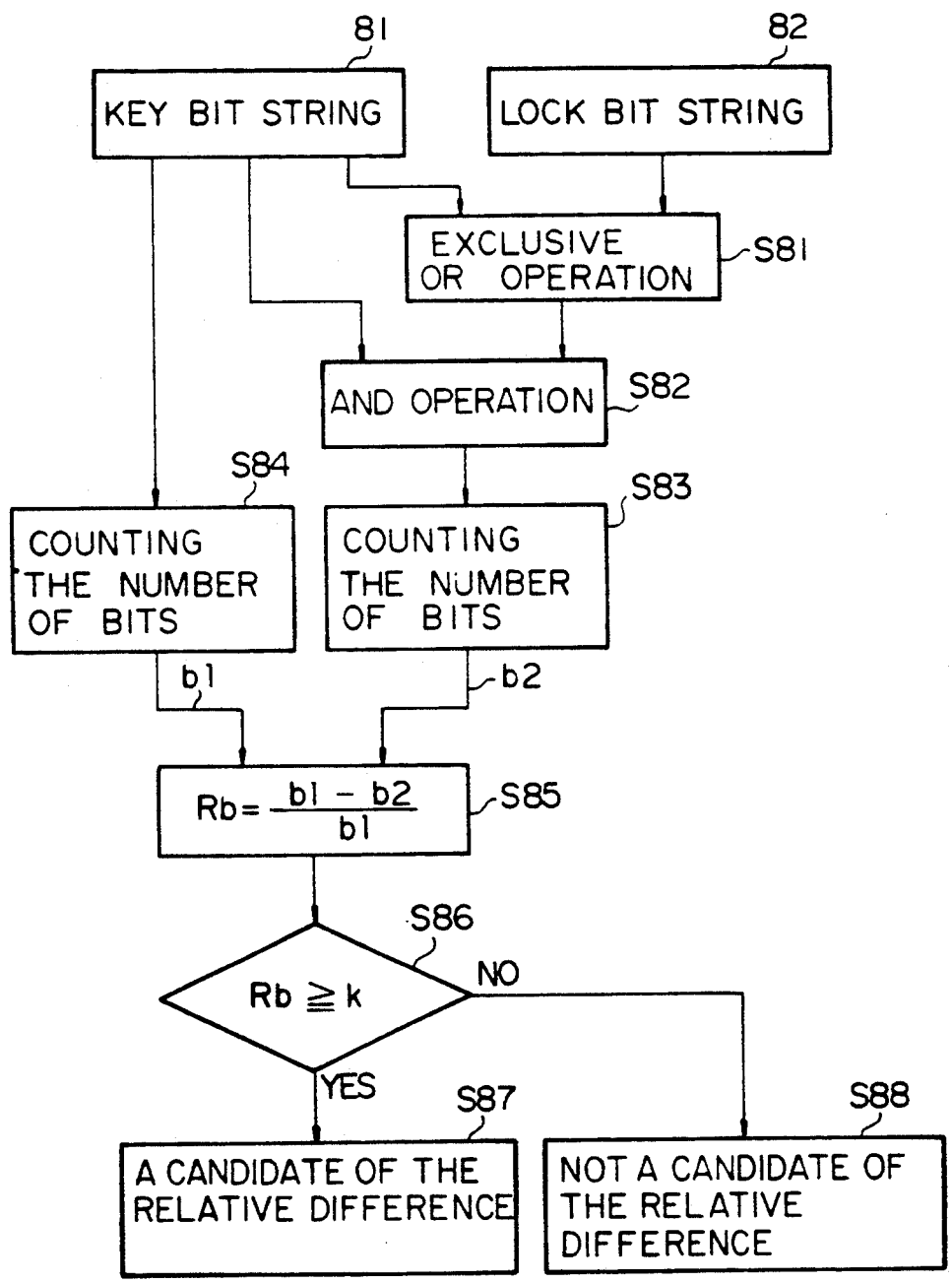
FIG. 8 is a flowchart showing a program sequence of a preliminary analytic sub-routine program executed by the data processing section of the information retrieval system shown in FIG. 3.

The sequence of the preliminary analytic sub-routine program is illustrated in FIG. 8 in detail. The reference bit string of the piece of identifying information and each of the reference bit strings of the pieces of musical attributive catalog information are hereinbelow referred to as "key bit string" and "lock bit string", respectively, for the sake of simplicity. The sequence starts with reading the key bit string into one of the data registers 81 of the central processing unit 21, and the central processing unit 21 sequentially accesses the index table TBL1 or TBL2 to put the lock bit string into another data register 82. On the key and lock bit strings, the central processing unit 21 carries out a series of logical operations. Namely, the key bit string is ex-ORed with the lock bit string at step S81, and the resultant bit string is further ANDed with the key bit string at step S82. Both of the key bit string and the lock bit string are n bit in size, and, for this reason, those logical operations are relatively simple.

Let us give you an example on the assumption that the key bit string and the lock bit string respectively represented by "ABC" and "CBD" are "111" and "111", respectively. When the key bit string "ABC" is ex-ORed with the lock bit string "CBD", the resultant bit string "ABCD" is "1001". The AND operation between the resultant bit string "1001" and the key bit string "111" yields a bit string "ABCD" of "100" which teaches that only the "A" characterizes the key bit string.

The resultant bit string of the AND operation is counted to decide the number of the bits of "1" incorporated therein at step S83, and the key bit string is also counted at step S84. Then, the central processing unit 21 proceeds to step S85 and calculates the ratio Rb of different bits to the total bits of the key bit string. The ratio Rb is given by Equation 1:

$$Rb = (b1 - b2)/b1 \qquad \text{(Equation 1)}$$

where b1 is the number of the bits incorporated in the key bit string and b2 is the number of the bits of "1" contained in the resultant bit string of the AND operation. The ratio Rb is then compared with a predetermined boundary value k to see whether or not the ratio Rb is equal to or greater than the predetermined boundary value k as by step S86. If the answer to the step S85 is given in the positive, the central processing unit 21 decides that the lock bit string is roughly resemblant to the key bit string as by step S87, and stores the lock bit string in the data memory unit 22 as being a candidate of the relative difference of the key bit string. On the other hand, if the answer to the step S86 is given in the negative, the central processing unit discards the lock bit string at step S88 as not being a candidate of the relative difference. Thus, the lock bit string is memorized as a candidate of the relative difference or is discarded depending upon the ratio Rb, and the central processing unit repeats the access to the data memory unit for retrieving another reference bit string in the index table TBL1 or TBL2 until all of the reference bit strings are analyzed. In this way, the central processing unit 21 continues the preliminary analysis. When the preliminary analysis is completed, the central processing unit 21 leaves the preliminary analytic sub-routine program, and proceeds to a final analytic subroutine program SR4 as shown in FIG. 7.

In the final analytic sub-routine program SR4, the central processing unit 21 produces a two-dimensional matrix for calculating a similarity S. Namely, the central processing unit 21 retrieves the key word (not the reference bit string) and stores it in the data register. Subsequently, the central processing unit 21 accesses one of the composer's name or the phrases in the index table TBL1 or TBL2 with reference to the reference bit strings determine to be candidates in the preliminary analytic sub-routine program SR3. The central processing unit adds one character or symbol to the character string or the note string of the key word, and the same character or symbol is added to the composer's name or the phrase read out from the index table TBL1 or TBL2. The key word thus added with the character or symbol is hereinafter referred to as a "modified key word", and the composer's name or the phrase from the index table is referred to as a "modified composer's name or the modified phrase". Then, every character or every note of the modified key word is successively compared with all of the characters or the notes of the modified composer's name or the modified phrase to see whether or not two characters or notes are identical with each other. If ith character or note of the modified key word is matched with jth character or note of the modified composer's name or the modified phrase, the central processing unit 21 calculates a score mi,j as follows $$m_{i,j} = m(j-1), (j-1) + a \quad \text{(Equation 2)}$$

where a is a predetermined positive point. However, if the ith character or note is mis-matched with the jth character or note, the score is given as $$m_{i,j} = \text{Maximum} [m_{i,j-1} - b, m_{i-1,j} - c] \quad \text{(Equation 3)}$$

where b and c are predetermined negative points, respectively and "Maximum" instructs to pick up either of $m_{i,j-1} - b$, $m_{i-1,j} - c$ whichever is larger than the other. Thus, the central processing unit 21 repeats the comparison followed by either calculation for every character or note of the modified key word. In the series of the calculations, if the predetermined positive point is increased in absolute value or the predetermined negative points are decreased in absolute value, the central processing unit 21 tends to decide the composer's name or the phrase resemblance. The initial values of the score are given as Equations 4 and 5.

$$m_{0,j} = -j \cdot b \quad \text{(Equation 4)}$$

$$m_{i,0} = -i \cdot c \quad \text{(Equation 5)}$$

When the scores are calculated for all of the characters or notes, a matrix is completed in the data memory 22, and the central processing unit 21 further calculates a similarity S as follows $$S = (\text{The maximum score in the matrix}) / (\text{the length of the key word}) \quad \text{(Equation 6)}$$

If the similarity exceeds a predetermined value x, the composer's name or the phrase is decided to be resemblant to the key word. Thus, similarities for each of the candidates can be used to determine the relative differences between the candidates and the key word.

Assuming now that the key word is representative of "Oumati" and that the index table TBL1 contains the correct Japanese composer's name "Oomachi", the matrix is formed as Table 4 where the symbol ? has the initial values, the positive point a is "1", and the negative points b and c are "0".

TABLE 4

| | ? | o | o | m | a | c | h | i |
|---|---|---|---|---|---|---|---|---|
| ? | 0 | 0 | 0 | 0 | 0 | 0 | 0 | 0 |
| o | 0 | 1 | 1 | 1 | 1 | 1 | 1 | 1 |
| u | 0 | 1 | 1 | 1 | 1 | 1 | 1 | 1 |
| m | 0 | 1 | 1 | 2 | 2 | 2 | 2 | 2 |
| a | 0 | 1 | 1 | 2 | 3 | 3 | 3 | 3 |
| t | 0 | 1 | 1 | 2 | 3 | 3 | 3 | 3 |
| i | 0 | 1 | 1 | 2 | 3 | 3 | 3 | 4 |

Table 5 shows another matrix on the assumption that the composer's name "Machida" is read out from the index table TBL1. In this example, the positive point a is assumed to be and the negative points b and c are "0".

TABLE 5

| | ? | m | a | c | t | i | d | a |
|---|---|---|---|---|---|---|---|---|
| ? | 0 | 0 | 0 | 0 | 0 | 0 | 0 | 0 |
| o | 0 | 0 | 0 | 0 | 0 | 0 | 0 | 0 |
| u | 0. | 0 | 0 | 0 | 0 | 0 | 0 | 0 |
| m | 0 | 1 | 1 | 1 | 1 | 1 | 1 | 1 |
| a | 0 | 1 | 2 | 2 | 2 | 2 | 2 | 3 |
| t | 0 | 1 | 2 | 2 | 2 | 2 | 2 | 3 |
| i | 0 | 1 | 2 | 2 | 2 | 3 | 3 | 3 |

Let us calculate the similarities of "Oomachi" and "Machida" . Since the key word length is "6" and the maximum value in the matrix for "Oomachi" is "4", the similarity So of "Oomachi" is given as follows $$So = (4/6) \times 100 = 66.7\%$$

However, the similarity Sm of "Machida" is given as:

$$Sm = (3/6) \times 100 = 50\%$$

If the predetermined value x or the criterion is 50%, both of the composer's names are selected. However, a criterion of 60% allows only the composer s name "Oomachi" to be selected.

The central processing unit 21 repeats the access to the index table TBL1 or TBL2, the formation of the matrix and the calculation of the similarity for all of the composer's names or the phrases. The selected composer's names or the phrases are memorized in the data memory unit 22 in the order of the similarity, and, then, the central processing unit 21 proceeds to a displaying sub-routine program SR5 as shown in FIG. 7.

Figure 9:
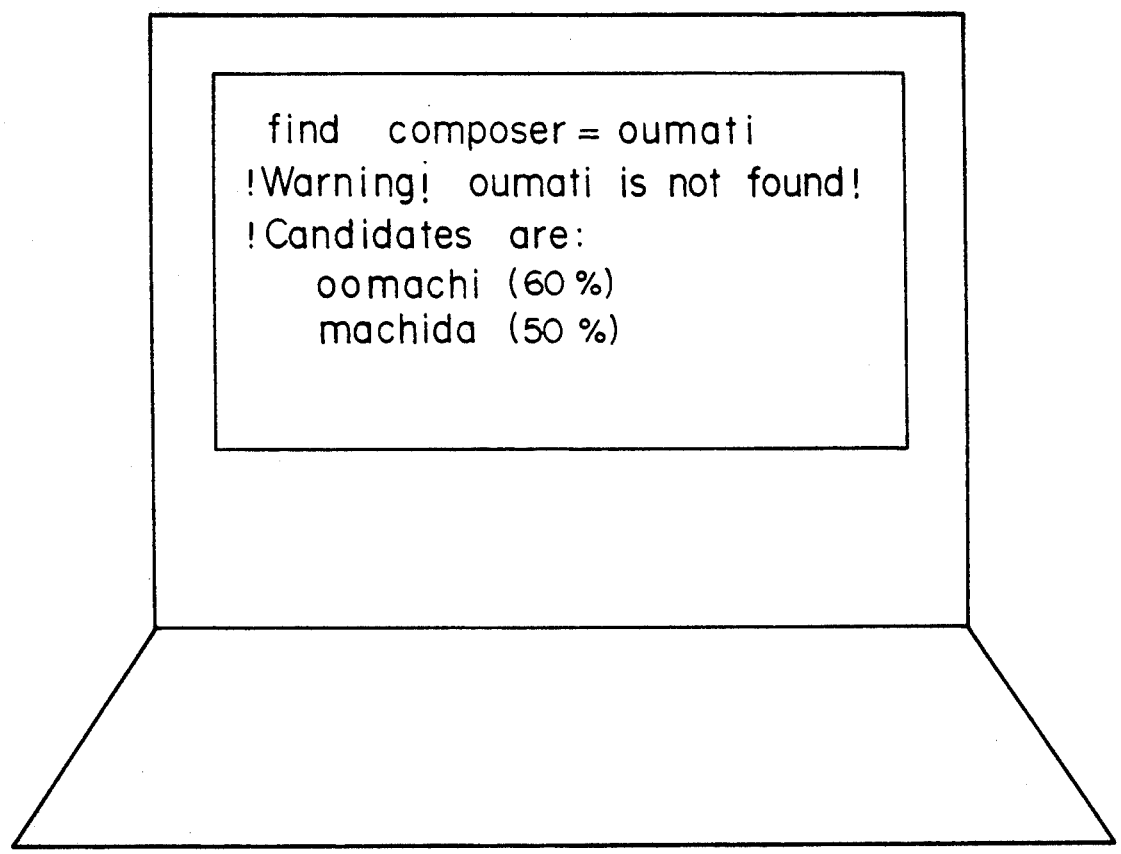
FIG. 9 is a front view showing a display unit where relative differences are indicated together with messages.

In the displaying sub-routine program, the central processing unit requests the display controlling unit 25 to produce character images of the selected words or phrases together with messages on the display unit 24 as shown in FIG. 9. With the messages, the user notices that the key word is incorrect, and is prompted for selecting one from the selected words, or phases. The relative differences allow the user to remember the correct key word, and, accordingly, accelerate access to the correct musical information. In the instance shown in FIG. 9, the message includes the similarity. The similarity may disappear from the display if the value thereof is less than a predetermined value. The predetermined value may be variable and given by the user. The calculated values of similarity are indicative of the relative differences between the candidates and the key word.

When a correct composer's name is supplied from the character keyboard 16, the central processing unit accesses the musical data file MDB, and the pieces of musical data information are indicated on the display unit 24.

Although one particular embodiment of the present invention have been shown and described, it will be obvious to those skilled in the art that various changes and modifications may be made without departing from the spirit and scope of the present invention. In the information retrieval system hereinbefore described, the pieces of musical data information are provided in the form of musical scores, however, the pieces of musical data information may be provided in various forms such as, for example, a history, a player or a singer. Moreover, of the candidates selected in the preliminary analytic sub-routine program may be classified in terms of similarity thereby indicating a relative difference between the candidates and the key word. In another implementation, a printer unit associated with a driver unit may be coupled to the multi-bit bus system, and the related differences may be printed on a proper paper. The above described relative difference analyzer carries out the preliminary analysis using reference bit strings, however, the key word may be directly compared with the composer's names or the phrases, and this implementation is conducive to simplicity of the data base under the sacrifice of the execution time period.

A phrase given by a user may be different in key from the actual phrase. In order to cope with such an incorrect input phrase, the data base may have a plurality of phrases arranged in twelve keys for each candidate, however, another data base allows the given phrase to be compared with the twelve phrases which are different in key and sequentially produced upon comparison. The latter approach is advantageous over the former approach in memory space consumed by the data base.

What is claimed is:

1. A relative difference analyzer for an information retrieval system, said relative difference analyzer comprising:
    a) input means for receiving a key word representative of a piece of identifying information, and for converting said key word into a key bit string having a predetermined fixed length;
    b) storing means for storing a data base, said data base including a data file, said data file containing a plurality of books, each of said books including, respectively, index records for storing respective pieces of attributive catalog information and detail data records for storing respective pieces of detailed data information corresponding to said pieces of attributive catalog information, said pieces of attributive catalog information each being associated with a corresponding lock bit string, said lock bit strings being stored in said index records with said pieces of attributive catalog information, said lock bit strings each having a predetermined fixed length equal to the predetermined fixed length of said key bit string;
    c) analyzing means for searching said index records for comparing said key bit string with said lock bit strings to determine a set of candidates from said pieces of attributive catalog information and for determining relative differences between said candidates and said piece of identifying information, each of said relative differences represented by a ratio between a first number and a second number, said first number representing a number of characters which are different between one of said candidates and said piece of identifying information, and said second number representing a total number of characters in said piece of identifying information;
    d) indicating means for indicating said relative differences, if any; and
    e) a bus system for electrically interconnecting said input means, said data base, said analyzing means and said indicating means.

2. A relative difference analyzer for a musical information system, said relative difference analyzer comprising:
    a) input means for receiving a key word representative of a piece of identifying information, said piece of identifying information being indicative of a musical attribute, and for converting said key word into a key bit string having a predetermined fixed length;
    b) storing means for storing a data base, said data base including a data film, said data file containing a plurality of books, each of said books including, respectively, index records for storing respective pieces of musical attributive catalog information and detail data records for storing respective pieces of detailed musical data information corresponding to said pieces of musical attributive catalog information, said pieces of musical attributive catalog information each being associated with a corresponding lock bit string, said lock bit strings being stored in said index records with said musical attributive catalog information, said lock bit strings having a predetermined fixed length equal to the predetermined fixed length of said key bit string;
    c) analyzing means for searching said index records for comprising said key bit string with said lock bit strings to determine a set of candidates from said pieces of musical attributive catalog information and for determining relative differences between said candidates and said piece of identifying information each of said relative differences represented by a ratio between a first number and a second number, said first number representing a number of characters which are different between one of said candidates and said piece of identifying information, and said second number representing a total number of characters in said piece of identifying information;
    d) indicating means for indicating said relative differences, if any; and
    e) a bus system for electrically interconnecting said input means, said data base, said analyzing means and said indicating means, 3. A relative different analyzer as set forth in claim 2, in which said musical attribute indicated by said piece of identifying information comprises one of a composer's name and a phrase of a musical composition.

4. A relative different analyzer as set forth in claim 3, in which said pieces of musical attributive catalog information comprise first and second groups, the former including composer's names and the latter including phrases of musical compositions, and wherein said pieces of detailed musical data information are associated, respectively, with said pieces of musical attributive catalog information of said first group and said pieces of musical attributive catalog information of said second group.

5. A relative difference analyzer as set forth in claim 4, in which said musical compositions comprise a musical score.

6. A relative difference analyzer as set forth in claim 5, in which each of said phrases comprises the first phrase of the musical compositions.

7. A relative difference analyzer as set forth in claim 5, in which each of said phrases comprise features of the musical compositions.

8. A relative difference analyzer as set forth in claim 5, in which said data file is associated with first and second index tables for performing an expedited searching operation, and in which said first and second index tables correspond to said pieces of musical attributive catalog information comprising said first and second groups, respectively.

9. A relative difference analyzer as set forth in claim 8, in which said analyzing means comprise preliminary analyzing means for selecting candidates of said relative differences by using said first and second index tables, and final analyzing means for determining said relative differences from said candidates and said key word.

10. A relative difference analyzer as set forth in claim 9, in which said first index table has the pieces of musical attributive catalog information of said first group in the form of a coded character string as well as in the form of a reference bit string produced on the basis of the corresponding coded character string, and in which said second index table has the pieces of musical attributive catalog information of said second group in the form of a coded note string as well as in the form of a reference bit string produced on the basis of the corresponding coded note string.

11. A relative difference analyzer as set forth in claim 10, in which said preliminary analyzing means include key bit string producing means for producing a key bit string in the form of said reference bit string from said piece of musical attributive catalog information, logical means for comparing said key bit string with each of said pieces of musical attributive catalog information in the form of said reference bit string so as to count the number of component bits of the reference bit string identical with component bits of the key bit string, and calculating means for calculating a resemblant ratio of said piece of musical attributive catalog information for determined whether the piece of musical attributive catalog information is one of the candidates.

12. A relative difference analyzer as set forth in claim 11, in which said final analyzing means comprise comparing means for successively comparing each component character or each component note of said key word with all of the component characters of said coded character string or all of the component notes of the coded note string so as to calculate scores, each of said scores being indicative of a resemblance between each component character or each component note and one of the component characters of the coded character string or one of the component notes of the coded note string, and calculating means for calculating a similarity of said piece of musical attributive catalog information for determining said relative differences between said candidates and said key word.

13. A relative difference analyzer as set forth in claim 12, in which said indicating means comprises a display unit and an associated display controlling unit.

14. A relative difference analyzer as set forth in claim 13, in which said relative differences are indicated on said display unit in the form of character images together with messages, and in which each of said messages includes said similarity.

15. A relative difference analyzer as set forth in claim 14, in which said similarity disappears from said display unit if the value thereof is less than a predetermined value.

16. A relative difference analyzer as set forth in claim 15, in which said predetermined value is variable.

17. A relative difference analyzer as set forth in claim 1, in which said data file is associated with index table means for performing an expedited searching operation.

18. A relative difference analyzer as set forth in claim 17, in which said analyzing means comprise preliminary analyzing means for determining candidates of said relative differences by using said index table means, and final analyzing means for determining said relative differences between said candidates and said key word.

19. A relative difference analyzer as set forth in claim 18, in which the pieces of attributive catalog information are in the form of a code as well as in the form of a reference bit string produced on the basis of the corresponding code.

20. A relative difference analyzer as set forth in claim 19, in which said preliminary analyzing means includes key bit string producing means for producing a key bit string in the form of said reference bit line from said piece of identifying information, logical means for comparing said key bit string with each of said pieces of attributive catalog information in the form of said reference bit string so as to count the number of component bits of the reference bit string identical with component bits of the key bit string, and calculating means for calculating a resemblant ratio of said piece of attributive catalog information to determine whether the piece of attributive catalog information is one of the candidates.

21. A relative difference analyzer as set forth in claim 20, in which said final analyzing means comprise comparing means for successively comparing each component of said key word with all of the components of said code so as to calculate scores, each of said scores being indicative of a resemblance between each component of said key word and a respective component of the code, and calculating means for calculating a similarity of said piece of attributive catalog information for determining said relative differences between said candidates and said key word.

22. A relative difference analyzer as set forth in claim 21, in which said indicating means comprise a display unit and an associated display controlling unit.

23. A relative difference analyzer as set forth in claim 22, in which said relative differences are indicated on said display unit together with messages, and in which each of said messages includes said similarity.

24. A relative difference analyzer as set forth in claim 23, in which said similarity disappears from said display unit if the value thereof is less than a predetermined value.

25. A relative difference analyzer as set forth in claim 24, in which said predetermined value is variable.

26. A relative difference analyzer for an information retrieval system, as recited in claim 1, wherein said analyzing means for determining relative differences between said candidates and said piece of identifying information comprises:

forming means for forming said key word and said attributive catalog information corresponding to said candidates into a two-dimensional matrix;

comparing means for comparing, in said two-dimensional matrix, each of the characters of said key word to each of the characters of said attributive catalog information corresponding to said candidates; and determining means for determining the relative differences between said key word and said attributive catalog information corresponding to said candidates, based on the comparison performed by said comparing means in said two-dimensional matrix.

27. A relative difference analyzer for a musical information system, as recited in claim 2, wherein said analyzing means for determining relative differences between said candidates and said piece of identifying information comprises:

forming means for forming said key word and said musical attributive catalog information corresponding to said candidates into a two-dimensional matrix;

comparing means for comparing, in said two-dimensional matrix, each of the characters of said key word to each of the characters of said musical attributive catalog information corresponding to said candidates; and determining means for determining the relative differences between said key word and said musical attributive catalog information corresponding to said candidates, based on the comparison performed by said comparing means in said two-dimensional matrix.

* * * * *